(12) United States Patent
Knox

(10) Patent No.: US 6,588,186 B2
(45) Date of Patent: Jul. 8, 2003

(54) APPARATUS AND METHOD FOR QUICKLY RELEASING A HARNESS FROM A VEHICLE

(76) Inventor: Robert D. Knox, 125 N. Roberta Ave., Northlake, IL (US) 60164

( * ) Notice: Subject to any disclaimer, the term of this patent is extended or adjusted under 35 U.S.C. 154(b) by 0 days.

(21) Appl. No.: 10/037,961

(22) Filed: Nov. 9, 2001

(65) Prior Publication Data

US 2003/0009997 A1 Jan. 16, 2003

Related U.S. Application Data

(60) Provisional application No. 60/305,829, filed on Jul. 16, 2001.

(51) Int. Cl.$^7$ ............................................. B68B 5/08
(52) U.S. Cl. .............................................. 54/69; 54/50
(58) Field of Search .................... 54/69, 50; 278/21, 278/29

(56) References Cited

U.S. PATENT DOCUMENTS

| | | | |
|---|---|---|---|
| 216,741 A | * 6/1879 | Knights | 54/69 |
| 433,344 A | * 7/1890 | Holtman | 54/69 |
| 458,430 A | * 8/1891 | Sears et al. | 54/69 |
| 499,684 A | * 6/1893 | Spencer | 54/69 |
| 524,241 A | * 8/1894 | Bowers | 54/69 |
| 671,706 A | * 4/1901 | McCormick et al. | 54/69 |
| 809,577 A | * 1/1906 | Mckenzie | 54/69 |
| 883,134 A | * 3/1908 | Griffeth | 54/69 |
| 1,129,567 A | * 2/1915 | Griffeth | 54/69 |
| 3,144,741 A | * 8/1964 | Andersson | 54/2 |
| 4,473,991 A | * 10/1984 | La Mura et al. | 54/2 |
| 4,480,428 A | * 11/1984 | Gilbertson | 54/69 |
| 5,056,301 A | * 10/1991 | Garland et al. | 54/2 |

FOREIGN PATENT DOCUMENTS

SE 32386 * 1/1905 .................... 54/69

* cited by examiner

Primary Examiner—Charles T. Jordan
Assistant Examiner—Joan M. Olszewski
(74) Attorney, Agent, or Firm—Barnes & Thornburg

(57) ABSTRACT

A hitch assembly includes two frame members. One frame member of the frame includes a locking assembly for coupling the hitch assembly to a shaft of a sulky. The other frame member of the frame is adapted to secure the frame assembly to a harness of an animal such as a horse. A release assembly such as a pull pin assembly is utilized to releasably secure the first frame member to the second frame member. A method for releasing an animal harness from a vehicle is also described.

13 Claims, 7 Drawing Sheets

APPARATUS AND METHOD FOR QUICKLY RELEASING A HARNESS FROM A VEHICLE

This application claims the benefit of U.S. provisional patent application Ser. No. 60/305,829 filed Jul. 16, 2001.

FIELD

The present invention relates generally to hitches for securing a harness to a sulky or similar vehicle, and more particularly to an apparatus and method for quickly releasing a harness from a shaft or other component of the sulky or other vehicle.

BACKGROUND

In the field of harness racing, a horse pulls a vehicle, known as a sulky, which is driven by a driver. The sulky includes a pair of outwardly extending shafts which are secured to the horse's harness. A hitch is generally utilized to couple the shafts to the harness. One such hitch 100 is shown in the prior art drawings of FIG. 9. The hitch 100 includes a body 102 having a harness coupling portion 104 and a shaft coupling portion 106. The body 102 is unitary in construction. Namely, the body 102 may be constructed of several different individual components which are non-removably secured to one another by, for example, welding. As such, the harness coupling portion 104 is non-removably secured to the shaft coupling portion 106.

The body 102 also has C-shaped catch 108 defined therein. A pin or the like (not shown) associated with the shaft of the sulky is captured in the catch 108 in order to secure the hitch thereto. A lock mechanism 110 having a spring loaded pin 112 is utilized to lock or otherwise retain the pin of the shaft in the catch 108.

The horse's harness is advanced through a number of openings 114 defined in the harness coupling portion 104 of the body 102. In particular, the horse's harness may be looped or otherwise advanced through the openings 114 to secure the harness to the hitch. As such, the hitch 100 may be utilized to secure the harness to the shaft of the sulky.

The above identified configuration of a hitch 100 has a number drawbacks associated therewith. For example, the shaft of the sulky and the hitch must be maintained in a relatively narrow predetermined relationship with one another in order to allow the hitch to be uncoupled from the shaft. In particular, the coupling pins associated with the shaft must be advanced in a number of different directions to be inserted and/or removed from the catch 108 of the hitch 100. For example, to insert the pin of the shaft into the catch 108 of the body 102, the pin must first be advanced downwardly and then laterally into the catch 108 while the spring loaded pin 112 is positioned in a retracted position. Conversely, to remove the pin from the C-shaped catch 108, the spring loaded pin 112 is retracted such that the pin of the shaft may then be advanced laterally and upwardly so as to be disengaged from the hitch 100. Such two-directional movement of the pin is particularly difficult if the pin and C-shaped catch 108 are not aligned in a relatively parallel relationship with one another. Indeed, if the hitch and the shaft are skewed relative to one another, the pin may become jammed or otherwise engaged with the walls of the C-shaped catch 108 thereby preventing removal of the pin from the catch 108.

As such, the design of the hitch 100 renders the hitch difficult to disengage from the shaft during certain circumstances which may create an awkward and likely dangerous condition. For example, when a the horse becomes excited or unruly, the relative position between the hitch and the shaft is continuously changing thereby rendering very difficult the alignment necessary to disengage the pin of the shaft from the hitch 100.

This dangerous condition often occurs in the case of a spill or crash during operation of the sulky in which case the shafts may become positioned in a number of disarrayed orientations as a result of the crash which makes it difficult to align the hitches 100 with the shafts for purposes of removing the hitches 100 from the shafts. The dangerous condition often is exacerbated by the excited and unruly behavior of the horse reacting to the crash and to its inability to shed the sulky. Moreover, a horse attached to a sulky can become excited or unruly even without a spill or a crash, which also can be very dangerous to the driver and to the horse.

What is needed therefore is a hitch assembly which overcomes one or more of the above mentioned drawbacks.

SUMMARY

The present invention in accordance with a preferred embodiment provides a hitch assembly for securing an animal harness to a sulky or other vehicle. The hitch assembly comprises a first frame member adapted to be secured to the animal harness, and a second frame member releasably secured to the first frame member in any suitable manner. The second frame member is adapted to be secured to the vehicle.

The hitch assembly desirably comprises a release assembly positionable between a secured position and a released position. The first frame member is secured to the second frame member when the release assembly is positioned in the secured position, and the first frame member is separable from the second frame member when the release assembly is positioned in the released position. In a preferred embodiment, the release assembly comprises a pin positionable between a pin-engaged position and a pin-disengaged position. The first frame member is secured to the second frame member when the pin is positioned in the pin-engaged position, and the first frame member is separable from the second frame member when the pin is positioned in the pin-disengaged position. The first frame member may also have a first hollow tube secured thereto and the second frame member may have a second hollow tube secured thereto. The pin is positioned in the first hollow tube and the second hollow tube when the pin is positioned in the pin-engaged positioned.

Desirably, the first frame member has a number of harness-receiving openings defined therein, and the second frame member has a locking assembly secured thereto operable to secure the second frame member to the vehicle. The locking assembly may, for example, secure the second frame member to a shaft or other component of the vehicle.

In an other embodiment, there is provided a method of operating a hitch assembly to release an animal harness from a vehicle. The method includes the step of decoupling a first frame member of the hitch assembly from a second frame member of the hitch assembly. The method also includes the step of moving the first frame member relative to the second frame member such that the first frame member is spaced apart from the second frame member.

In yet another embodiment, there is provided a hitch assembly for coupling a horse harness to a shaft of a sulky. The hitch assembly includes a first frame member having a number of harness-receiving openings defined therein. A second frame member is releasably secured to the first frame member. The second frame member has a locking assembly secured thereto which is operable to secure the second frame member to the shaft of the sulky.

In an other embodiment, there is provided a method of operating a hitch assembly to selectively secure and release a horse harness from a shaft of a sulky. The method includes the step of securing the hitch assembly to the horse harness and the shaft of the sulky such that a first frame member of the hitch assembly is coupled to the horse harness, and a second frame member of the hitch assembly is coupled to the shaft of the sulky. The method also includes the steps of decoupling the first frame member from the second frame member and moving the first frame member relative to the second frame member such that the first frame member is spaced apart from the second frame member.

DETAILED DESCRIPTION OF THE DRAWINGS

Figure 1:
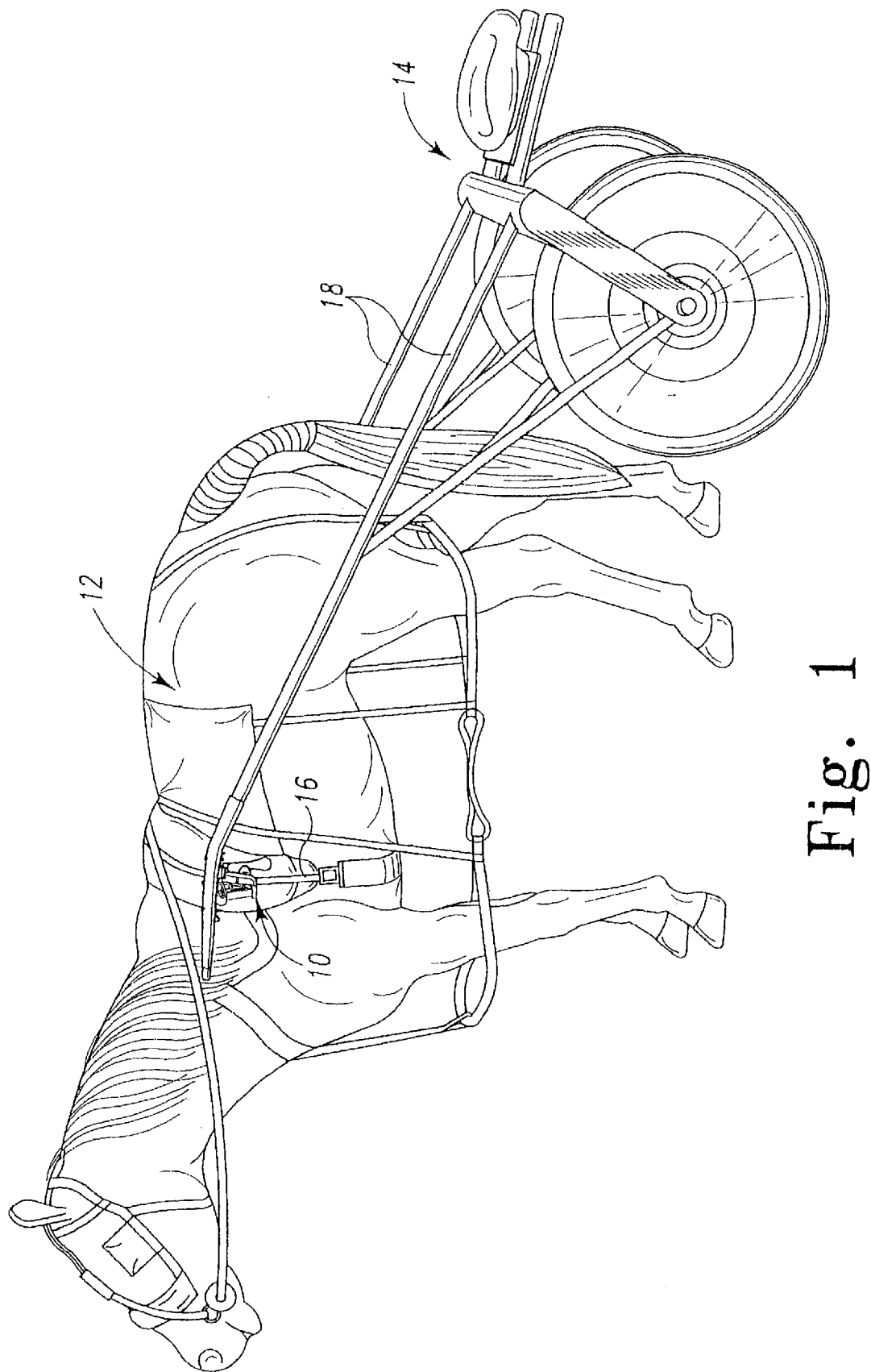
FIG. 1 is a perspective view which shows a horse having a harness that is secured to a shaft of a sulky by use of a hitch assembly.

While the invention is susceptible to various modifications and alternative forms, specific exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within in the spirit and scope of the invention.

The present invention is directed to an apparatus and method for quickly and easily detaching a harness of an animal from a vehicle. In regard to one illustrative embodiment, as shown in FIG. 1, a hitch assembly 10 may be utilized to secure an animal such as a horse 12 to a vehicle such as a sulky 14. In regard to this particular arrangement, the horse 12 has a harness 16 secured thereto, whereas the sulky 14 has a pair of shafts 18 outwardly extending therefrom. The hitch assembly 10 is utilized to secure the harness 16 to the shafts 18.

A single hitch assembly 10 desirably is utilized to secure each of the two shafts 18 to the harness 16. As such, in the exemplary embodiment shown in FIG. 1, two hitch assemblies 10 are utilized, with a first hitch assembly 10 securing the left shaft 18 of the sulky 14 to the harness, and a second hitch assembly 10 (not shown) securing the right shaft 18 (not shown) to the harness 16.

As shown in FIGS. 2–7, the hitch assembly 10 has a frame assembly 20 which includes a first or harness frame member 22 and a second or shaft frame member 24. The harness frame member 22 may have any suitable configuration. In a preferred embodiment, for example, the harness frame member 22 has a number of harness-receiving openings 26 defined therein. A portion of the harness 16 may be looped or otherwise advanced through the openings 26 to secure the hitch assembly 10 to the harness 16.

Figure 8:
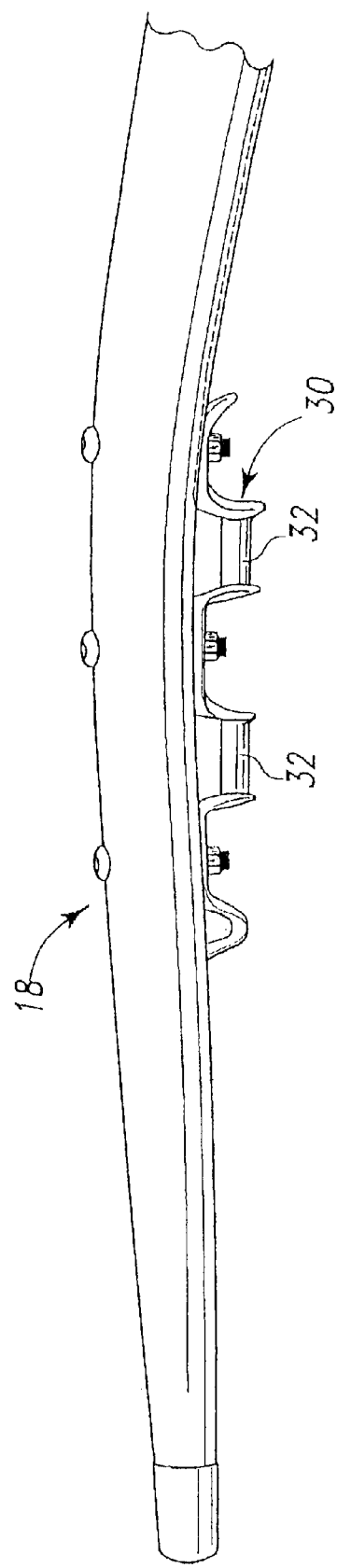
FIG. 8 is a fragmentary side elevational view of an end portion of the shaft of the sulky.
Figure 9:
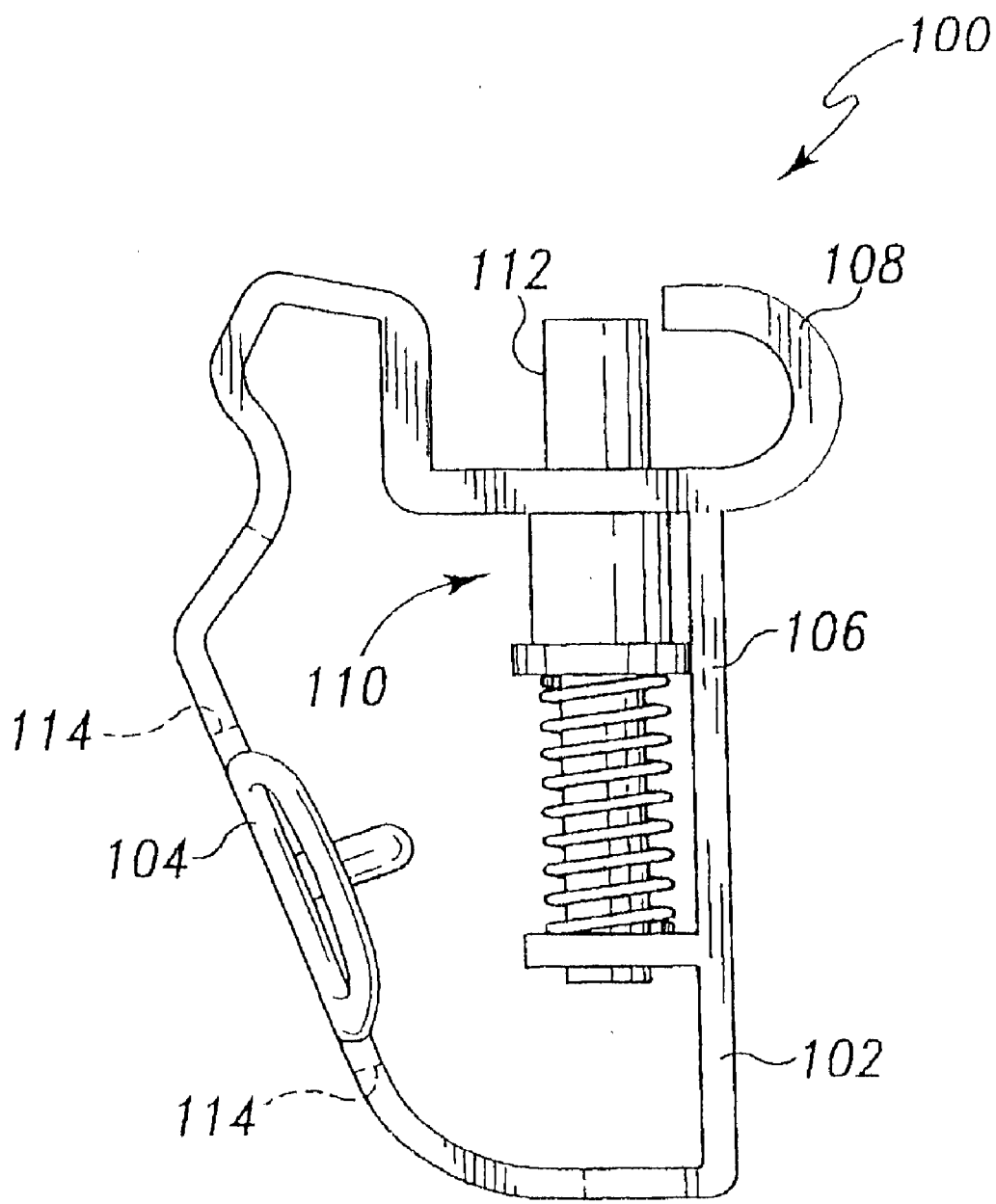
FIG. 9 is a side elevational view of a prior art hitch assembly.

The shaft frame member 24 also may have any suitable configuration, and desirably is secured to the shaft 18 of the sulky 14. In a preferred embodiment, for example, the shaft frame member 24 has a C-shaped catch 28 defined therein for securing the hitch assembly 10 to the shaft 18 of the sulky 14. In particular, as shown in FIG. 8, the shaft 18 of the sulky 14 has a mounting bracket 30 secured thereto. The bracket 30 has a pair of pins 32 defined therein. One of the pins 32 may be captured or otherwise positioned within the C-shaped catch 28 defined in the shaft frame member 24 to secure the shaft 18 to the hitch assembly 10. A locking assembly 34 having a pin 36 and a spring 38 is utilized to maintain the pin 32 of the bracket 30 within the C-shaped catch 28 of the hitch assembly 10. In particular, the spring 38 biases the pin 36 upwardly (as viewed in the orientation of FIG. 3) so as to block the opening 44 of the C-shaped catch 28.

Figure 3:
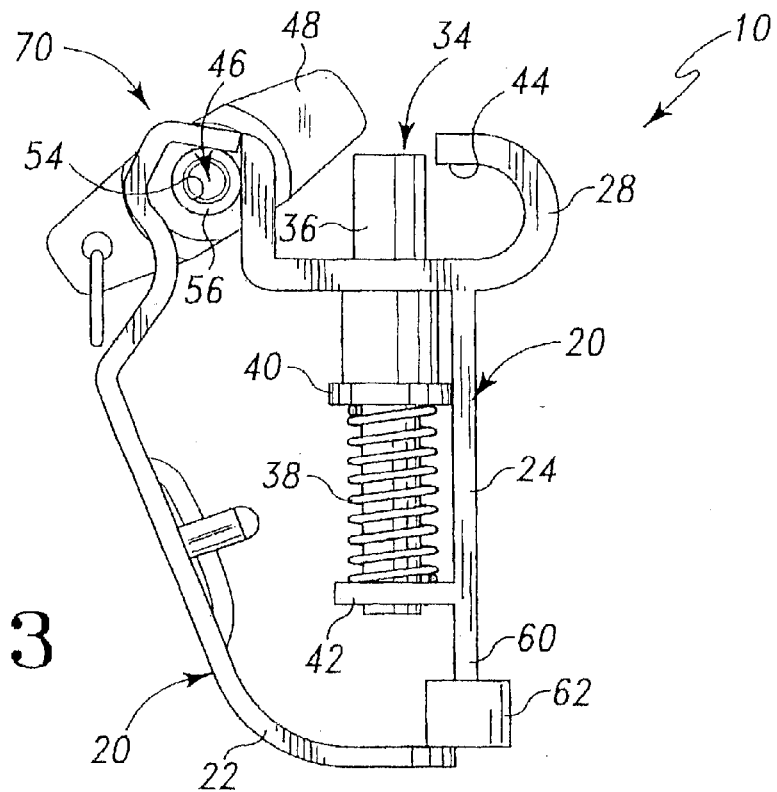
FIG. 3 is a side elevational view of the hitch assembly of FIG. 2.

As shown in FIG. 3, the spring 38 is positioned between a pair of flanges 40, 42. The flange 40 is secured to the pin 36, whereas the flange 42 is secured to the frame member 24. As such, the spring bias generated by the spring 38 urges the flange 40 and hence the pin 36 upwardly (as viewed in the orientation of FIG. 3). However, when a user pushes downwardly on the flange 40 (as viewed in the orientation of FIG. 3), the spring 38 is compressed thereby urging the pin 36 downwardly so as to expose the opening 44 defined by the C-shaped catch 28.

In such a manner, the pin 32 of the bracket 30 maybe selectively captured within the C-shaped catch 28 of the hitch assembly 10. In particular, with the pin 36 positioned downwardly (i.e., with the spring 38 compressed), the pin 32 may be advanced into the opening 44 defined by the C-shaped catch 28. Thereafter, the pin may be advanced upwardly and held in such a position by the spring 38 to lock or otherwise capture the pin 32 of the shaft 18 within the C-shaped catch 28 of the hitch 10.

In order to uncouple the shaft 18 from the hitch assembly 10, the pin 36 is advanced downwardly by compression of the spring 38 thereby exposing the opening 44 of the C-shaped catch 28. Thereafter, the pin 32 may be removed from the opening 44 of the C-shaped catch 28 of the hitch assembly 10 thereby uncoupling the shaft 18 from the hitch assembly 10.

In one manner, the hitch assembly 10 may be utilized to secure the horse's harness 16 to the shaft 18 of the sulky 14 in a manner similar to certain heretofore design hitches (e.g., the hitch 100 described above). However, as shall now be described in greater detail, the hitch assembly 10 may also be utilized to decouple the harness 16 from the shaft 18 of the sulky 14 under certain adverse conditions. To do so, the harness frame member 22 of the frame assembly 20 is releasably secured to the shaft frame ember 24 in any suitable manner. As such, the harness frame member 22 of the hitch assembly 10 may be separated from the hitch frame member 24 thereby releasing the shaft 18 from the harness 16 so as to quickly and easily release the horse 12 from sulky 14. The separation of the harness frame member 22 from the hitch frame member 24 is a complete separation in accordance with a preferred embodiment, but may, in accordance with alternative embodiments, be a partial separation sufficient to release the sulky 14 from the horse.

To do so, the hitch assembly 10 includes a release assembly 70. The release assembly 70 may be embodied as any type of mechanism which is capable of securing the frame members 22, 24 to one another, yet can be quickly and easily actuated so as to allow the two frame members 22, 24 to be separated from one another. As such, the release assembly 70 is positionable between a secured position in which the release assembly 70 secures the frame members 22, 24 to one another and a released position in which the two frame members 22, 24 are separable or otherwise movable relative to one another.

Figure 2:
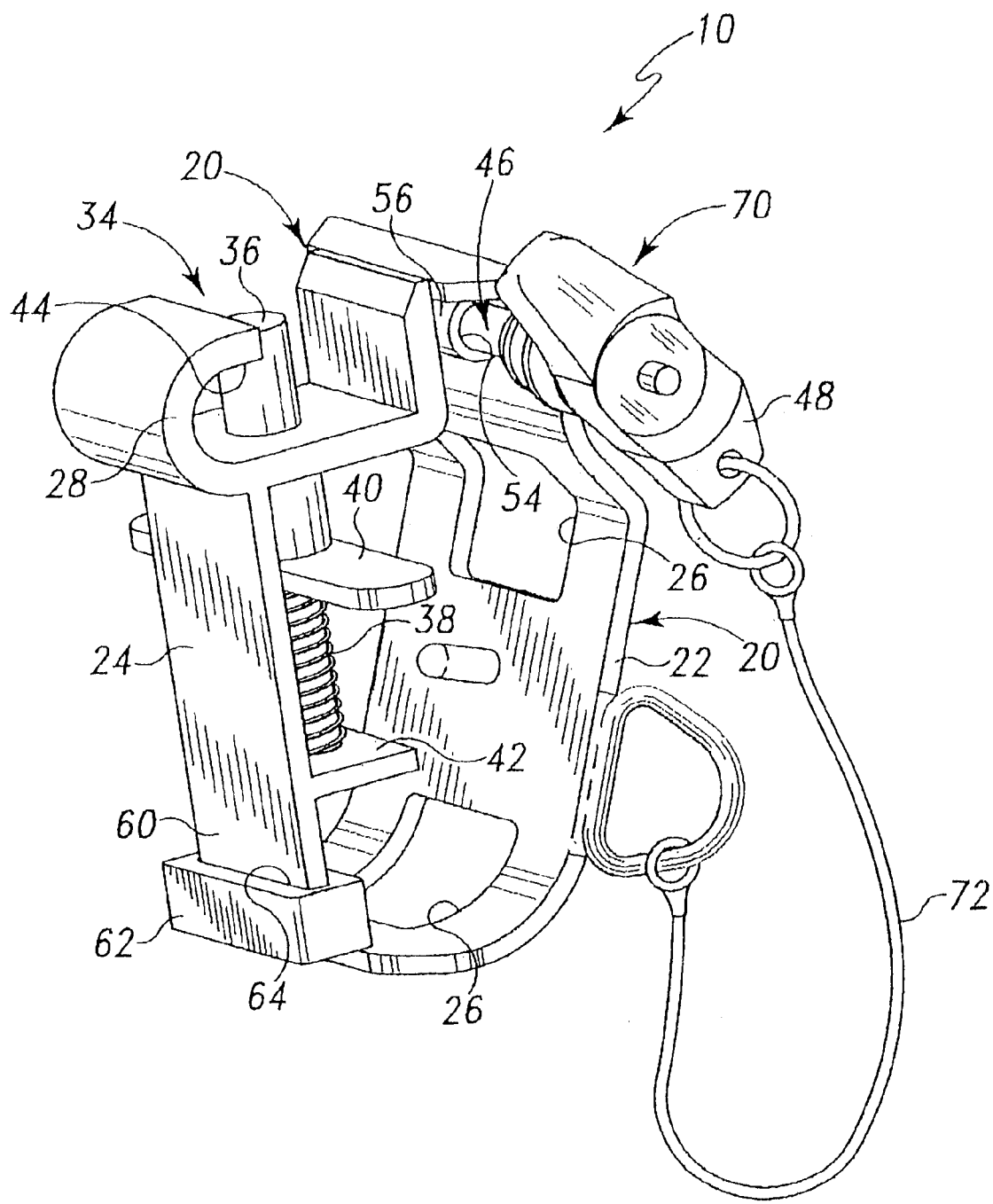
FIG. 2 is a perspective view of the hitch assembly of FIG. 1.
Figure 4:
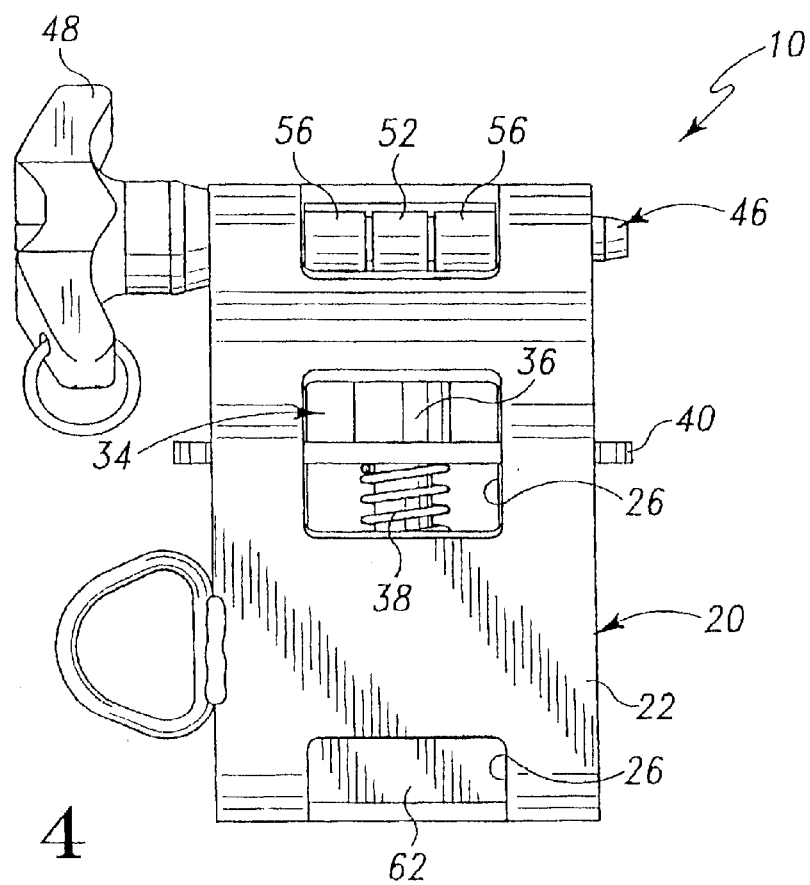
FIG. 4 is a front elevational view of the hitch assembly of FIG. 2.
Figure 5:
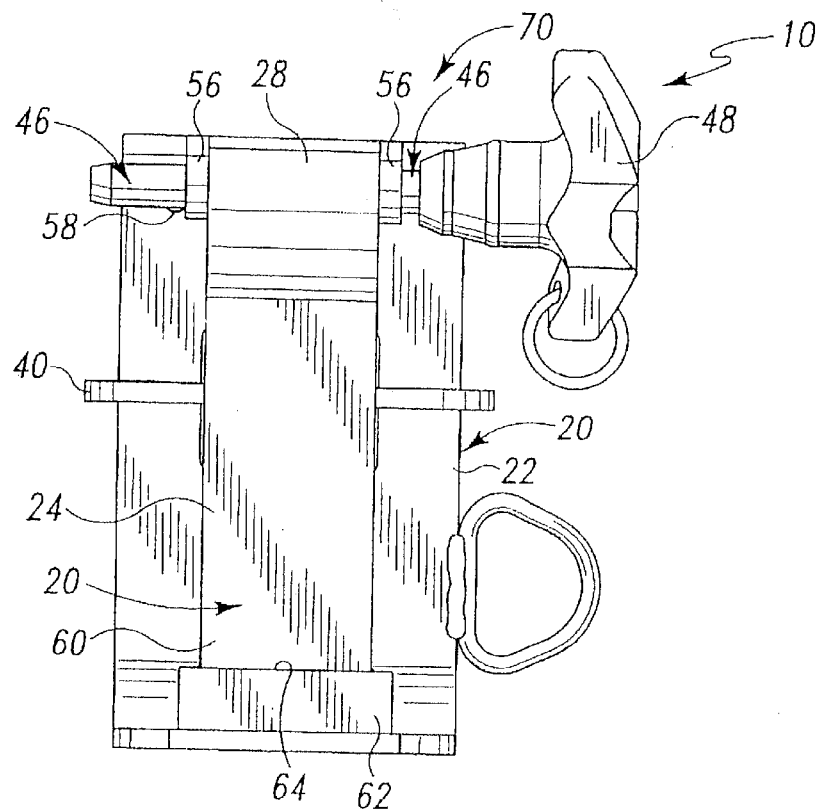
FIG. 5 is a rear elevational view of the hitch assembly of FIG. 2.
Figure 6:
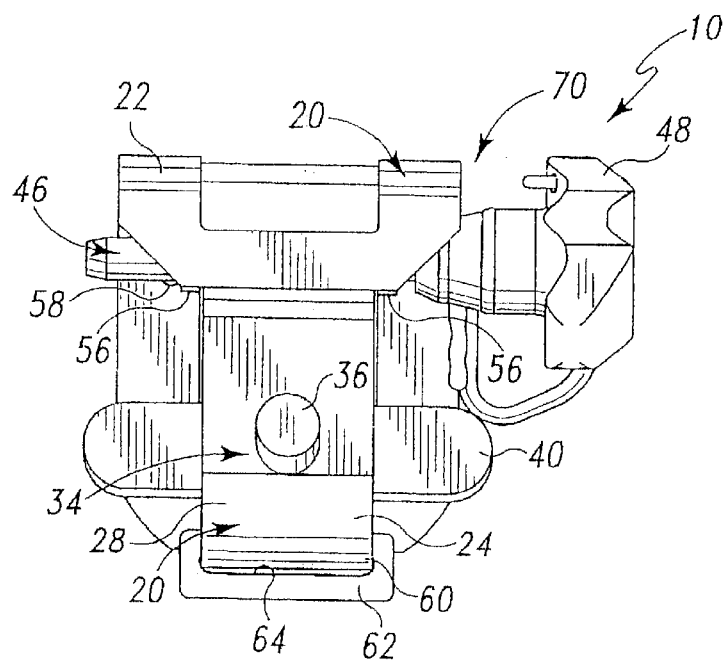
FIG. 6 is a top elevational view of the hitch assembly of FIG. 2.
Figure 7:
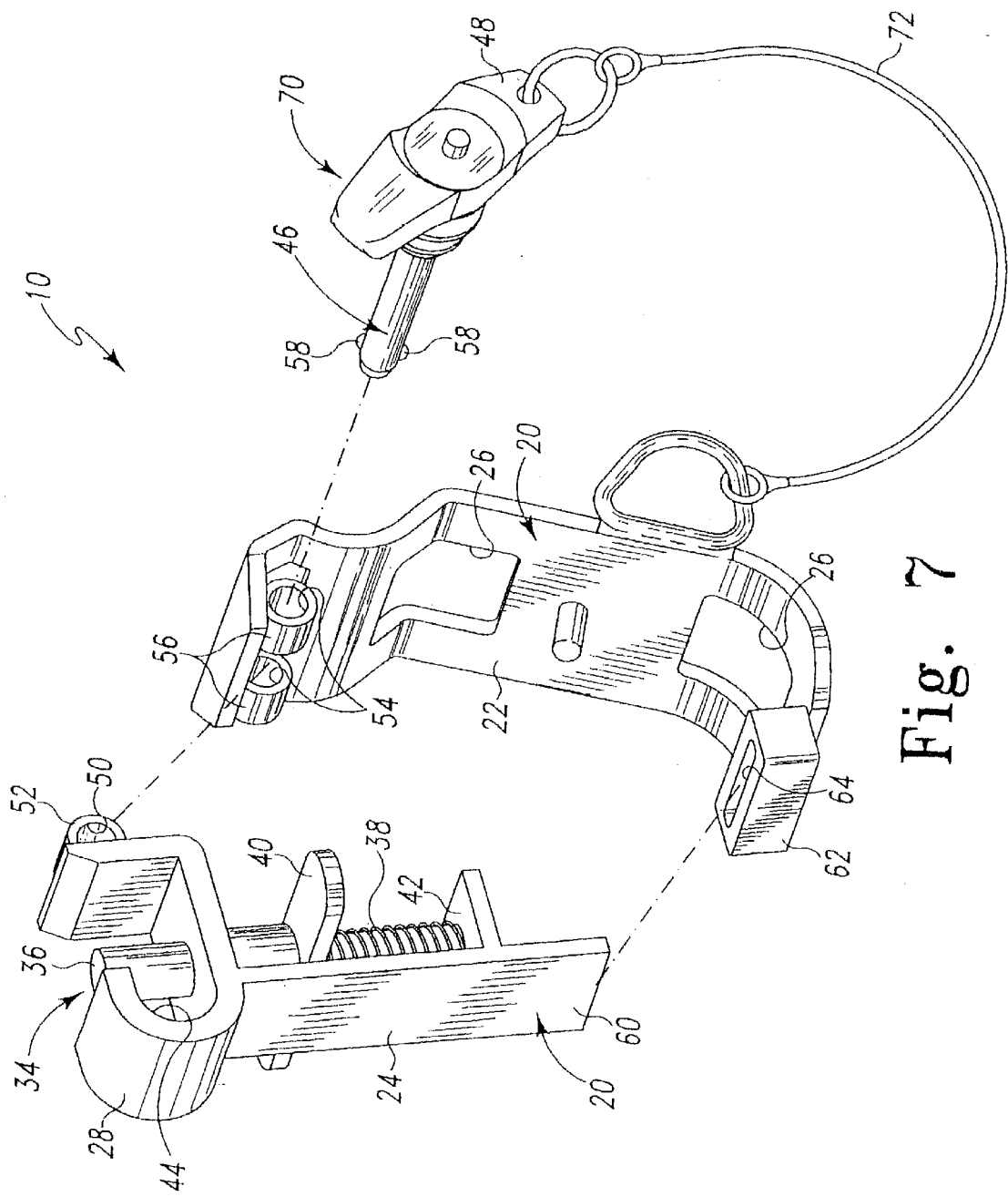
FIG. 7 is an exploded perspective view of the hitch assembly of FIG. 2.

In one exemplary embodiment, the release assembly 70 is embodied to include a pin 46 which is positionable in a hollow tube 52 secured to the frame member 24, along with a number of hollow tubes 56 secured to the frame member 22 (see FIGS. 4 and 7). The hollow tubes 52, 56 have central passages 50, 54 defined therein, respectively, as shown in FIG. 7. As such, the pin 46 is positionable in either a pin-engaged position (as shown in FIG. 2) or a pin-disengaged position (as shown in FIG. 7). Specifically, when the central passages 50, 54 of the hollow tubes 52, 56 are aligned with one another, the pin 46 may be advanced therethrough so as to position the pin 46 in its pin-engaged position thereby securing the upper portion of the frame member 22 to the upper portion of the frame member 24. Conversely, when the pin 46 is positioned in its pin-disengaged position (i.e., removed from the tubes 52, 56) the frame members 22, 24 are freely movable relative to one another.

As also shown in FIG. 7, the pin 46 has a handle 48 which may be grasped and pulled by a user in order to remove the pin 46 from the tubes 52, 56. In lieu of the handle 48, the pin 46 may alternatively be configured with a ring or a bar. The pin 46 also has a number of spring-loaded detents 58 which are utilized to maintain the pin 46 within the hollow tubes 52, 56 until removed by a user. The pin 46 may be embodied as any type of pin which is positionable in the tubes 52, 56. For example, any one of a number of heavy-duty ball lock pins which are commercially available from Carr Lane Manufacturing Company of St. Louis, Mo. Moreover, as shown in FIG. 7, a portion of the pin (e.g., the handle 48) may be coupled to the frame assembly 20 by use of a strap 72 in order to prevent the pin 46 from being lost or otherwise displaced.

A lower end 60 of the frame member 24 is also releasably secured to the frame member 22. Specifically, a receiver 62 is secured to the lower end of the frame member 22. The receiver 62 has a slot 64 defined therein. The lower end 60 of the frame member 24 is positionable in the slot 64. Hence, when the lower end 60 of the frame member 24 is positioned in the slot 64, and the pin 46 is positioned in the tubes 52, 56, the first frame member 22 is secured to the second frame member 24. The receiver 62 may have a recess or similar feature defined therein to allow for additional clearance for the lower end of the pin 36 during downward travel thereof.

In operation, the hitch assembly 10 may be utilized to couple the horse's harness 16 to the shafts 18 of the sulky 14. As described above, during use of the hitch assembly 10, the harness 16 is looped or otherwise advanced through the openings 26 in the harness frame member 22, whereas the pin 32 of the shaft 18 is captured within C-shaped catch 28 of the shaft frame member 24. In such a manner, the hitch assembly 10 couples the shaft 18 to the harness 16. A separate hitch assembly 10 is utilized to couple the harness 16 to each of the two shafts 18 of the sulky 14. The hitch assembly 10 may be provided in both "right-handed" and "left-handed" configurations, as needed.

When the hitch assembly 10 is utilized in such a manner, the harness 16 may be decoupled from the shafts 18 of the sulky 14 in a number of different manners. For example, the harness 16 may be uncoupled from the shafts 18 of the sulky 14 by use of the locking assembly 34. Specifically, a user may urge downwardly on the flange 40 (as viewed in the orientation of FIG. 3) to urge the pin 36 downwardly thereby exposing the opening 44 of the C-shaped catch 28 of the shaft frame member 24. In such a manner, the shaft 18 and the hitch 10 may then be manipulated or otherwise moved relative to one another so as to allow the pin 32 of the bracket 30 to be removed from the area within the C-shaped catch 28 of the frame member 24.

However, in certain circumstances, it may be desirable to quickly and easily separate the harness 16 from the shafts 18 of the sulky 14 irrespective of the position of the harness and shafts relative to one another. In such cases, it is generally difficult to use the locking assembly 34 in the manner described above. As such, the user may grasp the handle 48 of the pin 46 and pull or otherwise urge the pin 46 out of the tubes 52, 56. Once the pin 46 is removed from the tubes 52, 56, the shaft frame member 24 may be lifted or otherwise urged so as to remove the lower end 60 thereof from the slot 64 defined in the receiver 62. Once removed from the slot 64, the harness frame member 22 and the shaft frame member 24 of the hitch assembly 10 may be separated from one another thereby separating the horse's harness 16 from the shafts 18 of the sulky 14.

Such "quick-release" capability of the hitch assembly 10 is particularly useful for separating the horse's harness 16 from the shafts 18 of the sulky 14 in certain circumstances. For example, in the event of an accident, such as a spill or the like, the afore-described quick release feature of the hitch assembly 10 (i.e., use of the pin 46) allows for the harness 16 and the shaft 18 of the sulky 14 to be separated from one another irrespective of the orientation of the shafts 18 relative to the harness 16. Such quick release of the two frame members 22, 24 of the hitch assembly 10 is also useful in the case of decoupling a horse 12 from the sulky 14 in the event the horse 12 becomes unruly or otherwise excited.

While the invention has been illustrated and described in detail in the drawings and the foregoing description, such an illustration and description is to be considered exemplary and not restrictive in character, it being understood that only the illustrative embodiment has been shown and described and that all changes and modifications have become within the spirit of the invention are desired to be protected.

There are a plurality of advantages of the present invention arising from the various features of the hitch assembly described herein. It will be noted that alternative embodiments of the hitch assembly of the present invention may not include all of the features described but yet still benefit from at least some of the advantages of such features.

What is claimed is:

1. A hitch assembly for securing an animal harness to a vehicle, comprising:

a first frame member adapted to be secured to the animal harness, the first frame member has a first hollow tube secured thereto;

a second frame member releasably secured to the first frame member, the second frame member (i) being adapted to be secured to the vehicle, and (ii) having a second hollow tube secured thereto; and a release assembly comprising a pin positionable between a pin-engaged position and a pin-disengaged position;

wherein the first frame member is secured to the second frame member when the pin is positioned in the pin-engaged position, and the first frame member is separable from the second frame member when the pin is positioned in the pin-disengaged position, and the pin is positioned in the first hollow tube and the second hollow tube when the pin is positioned in the pin-engaged position.

2. The hitch assembly of claim 1, further comprising a strap securing the pin to one of the first and second frame members.

3. The hitch assembly of claim 1, wherein:

the first frame member has a number of harness-receiving openings defined therein, the second frame member has a locking assembly secured thereto, and the locking assembly is operable to secure the second frame member to the vehicle.

4. The hitch assembly of claim 1, wherein:

the vehicle comprises a sulky having a shaft extending therefrom, the second frame member has a locking assembly secured thereto, and the locking assembly is operable to secure the second frame member to the shaft of the sulky.

5. A method of operating a hitch assembly to release an animal harness from a vehicle, comprising the steps of:

decoupling a first frame member of the hitch assembly from a second frame member of the hitch assembly; and moving the first frame member relative to the second frame member such that the first frame member is spaced apart from the second frame member, wherein (i) the first frame member has a first hollow tube secured thereto, (ii) the second frame member has a second hollow tube secured thereto, and (iii) the decoupling step comprises removing a pin from the first hollow tube and the second hollow tube.

6. The method of claim 5, wherein during both the decoupling step and the moving step:

the first frame member is secured to the animal harness, and the second frame member is secured to the vehicle.

7. The method of claim 5, wherein:

the hitch assembly comprises a release assembly, and the decoupling step comprises moving the release assembly from a secured position in which the first frame member is secured to the second frame member to a released position in which the first frame member is separable from the second frame member.

8. The method of claim 5, wherein:

the release assembly comprises a pin, and the decoupling step comprises moving the pin from a pin-engaged position in which the first frame member is secured to the second frame member to a pin-disengaged position in which the first frame member is separable from the second frame member.

9. The method of claim 5, wherein:

the vehicle comprises a sulky having a shaft extending therefrom, the second frame member has a locking assembly secured thereto, the locking assembly is operable to secure the second frame member to the shaft of the sulky, the first frame member is secured to the animal harness during both the decoupling step and the moving step, and the second frame member is secured to the shaft of the sulky during both the decoupling step and the moving step.

10. A hitch assembly for coupling a horse harness to a shaft of a sulky, comprising:

a first frame member having a number of harness-receiving openings defined therein; and a second frame member releasably secured to the first frame member, the second frame member having a locking assembly releasably securing the second frame member to the shaft of the sulky; wherein:

the first frame member has a first hollow tube secured thereto, the second frame member has a second hollow tube secured thereto, and the first frame member is secured to the second frame member when the pin is positioned in the first hollow tube and the second hollow tube, and the first frame member and the second frame member are movable relative to one another when the pin is removed from the first hollow tube and the second hollow tube.

11. A method of operating a hitch assembly to selectively secure and release a horse harness from a shaft of a sulky, comprising the steps of:

securing the hitch assembly to the horse harness and the shaft of the sulky such that (i) the horse harness is advanced through a number of harness-receiving openings defined in a first frame member of the hitch assembly, and (ii) a second frame member of the hitch assembly is releasably coupled to the shaft of the sulky;

decoupling the first frame member from the second frame member; and moving the first frame member relative to the second frame member such that the first frame member is spaced apart from the second frame member;

wherein the horse harness is freely movable relative to the shaft of the sulky during the moving step; and wherein:

the first frame member has a first hollow tube secured thereto, the second frame member has a second hollow tube secured thereto, and the securing step comprises positioning a pin in the first hollow tube and the second hollow tube.

12. The method of claim 11, wherein during both the decoupling step and the moving step:

the first frame member is coupled to the horse harness, and the second frame member is coupled to the shaft of the sulky.

13. The method of claim 11, wherein the decoupling step comprises removing the pin from the first hollow tube and the second hollow tube.

* * * * *